C. D. TILLISON.
STEAM AND VACUUM TRAP.
APPLICATION FILED JULY 13, 1908.

948,028.

Patented Feb. 1, 1910.

Witnesses
Ronald C. Griffin

Inventor
Charles D. Tillison
Attorney
Carlos P. Griffin

UNITED STATES PATENT OFFICE.

CHARLES DAVID TILLISON, OF OAKLAND, CALIFORNIA.

STEAM AND VACUUM TRAP.

948,028.　　　　　Specification of Letters Patent.　　Patented Feb. 1, 1910.

Application filed July 13, 1908. Serial No. 443,401.

*To all whom it may concern:*

Be it known that I, CHARLES DAVID TILLISON, a citizen of the United States, residing at Oakland, in the county of Alameda and State of California, have invented a new and useful Steam and Vacuum Trap, of which the following is a specification in such full and clear terms as will enable those skilled in the art to construct and use the same.

This invention relates to a combined steam and vacuum trap which may be used to trap off the water from either a live steam line or from a vacuum line, the operation of the trap being automatic.

An object of the invention is to provide a trap that will be convertible for either of the above purposes at the will of the engineer, the only change necessary being the closing of two valves when the trap is to be used on a steam line.

Figure 1:
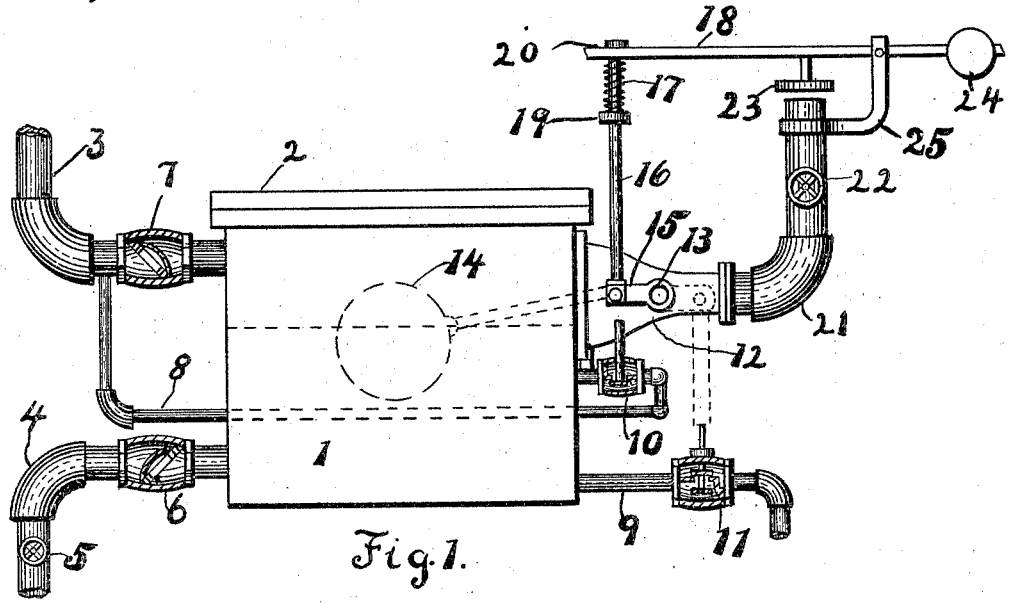
Figure 2:
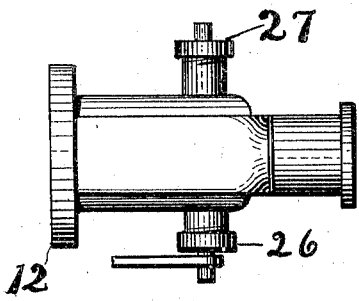
Figure 3:
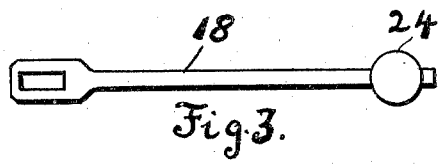
Figure 4:
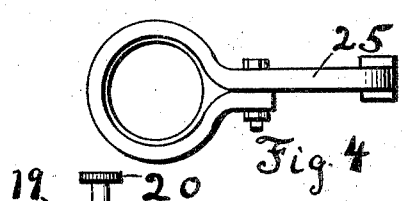
Figure 5:
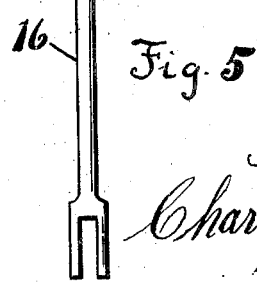

In the drawings, in which the same numeral is applied to the same portion throughout, Figure 1 is a front elevation of the complete steam trap, the check valves being shown in section, Fig. 2 is a plan view of the bonnet on an enlarged scale, Fig. 3 is a plan view of the valve lever on a large scale, Fig. 4 is a plan view on a large scale of the clamp used to secure the atmosphere valve to the air pipe, and Fig. 5 is a view at right angles to that of Fig. 1 of the lever operating link.

The trap is shown at 1 and may be of any desired shape, and it has the cover 2 secured thereto in any manner. The trap has the pipes 3, and 8 leading into it, and the pipes 4, 9 and 21 leading from it, the pipe 3 leading from the steam or vacuum line, as the case may be. In the pipe 3 there is a check valve which opens freely toward the trap 1, and the pipe 8 has a valve which opens freely toward the trap 1, but the latter is a much smaller valve and has a stem which is adapted to be depressed when the arm 15 moves down in the proper manner as will be explained later.

The pipe 4 has a check valve 6 which opens freely away from the trap, and it has a cut off valve 5, the object being to make use of the cut off valve when it may be necessary to use the trap as a steam trap. The pipe 9 is provided with a double acting valve 11, the purpose of which is to allow the water to escape when steam is used in the trap, and to hold a vacuum when the trap is being used to trap off the water from a vacuum line.

The bonnet 12 is secured to the side of the trap 1 by means of a flange 12', said flange being bolted to the trap. This bonnet has a shaft 13 projecting through it and inside the bonnet there is an arm on the end of which is the ball float 14. On the outer end of the shaft 13 there is an arm 15 to which is connected the link 16 said link having nuts 19 and 20 near the top thereof, spring 17 being interposed between the lower nut and the lever 18 through a slot in which the link 16 passes. To the bonnet is secured the pipe 21 which is turned upwardly and which is open at the top. The pipe is provided with a cut off valve 22, which is closed when steam is in the pipe 3. To the upper extension of the pipe 21 there is secured a clamp 25 which carries the lever 18, said lever supporting the outwardly opening valve 23. In order that the lever 18 may open with a pop it has the weight 24 attached thereto, the spring 17 on the link 16 assisting in this quick action.

The operation of the trap is as follows: The pipe 3 is connected with a vacuum line of an engine, the arrangement being as shown in the drawings. There being a lower pressure in the pipe 3 than in the trap 1 the valves 7 and 10 will tend to remain closed, but since the float operated valve 23 will be closed, owing to the fact that no water has accumulated in the trap, and also owing to the fact that valve 10 is held open by the arm 15, the pressure in the trap will at once become the same as the pressure in the pipe 3. When the two pressures become the same there will be nothing to prevent the water from filling the trap, since it is placed at the lowest point of the pipe 3. The water will then run into the trap until the ball rises high enough for the spring 17 to unseat the valve 23, which it will do forcibly. The air is thus allowed to enter the trap increasing the pressure therein to that of the atmosphere, thereupon the water will run out by gravity through the outwardly opening valve 6. When the ball float has fallen far enough to seat the valve 23 and for the lever 15 to open the valve 10 the pressure inside the trap will be reduced quickly to that of the pipe line 3 and the trap will again fill with water and repeat the operation automatically as often as necessary. The reason for providing a valve such as 10 is for the purpose of starting the vacuum in the trap, since it sometimes happens that the trap will not start unless some means is provided for mechanically opening a passage into the pipe line 3, but this valve is usually made too small for the water escape so a larger valve 7 is provided for the water after the trap has started. The water from the trap might also run off through the valve 11 at the same time that it is running through the valve 6, but since this valve is intended for the escape of water when the trap is under a heavy steam pressure it is very small and would not permit the escape of the water under atmospheric pressure rapidly enough for the trap to be used as a vacuum trap. When the pipe 4 connected with the valve 6 is quite long there is no reason for using the valve 10 and it can be dispensed with because the water will flow out rapidly enough to start the reduction of pressure in the trap, but the presence of the valve 10 insures the proper starting of the trap each time it is emptied. If the trap is to be used for the purpose of discharging the water from a steam pipe line the valves 22 and 5 are closed. The pressure in the trap will then be equal to that of the steam line and greater than the atmosphere. The arm 15 will then be turned around to the position shown in dotted lines in Fig. 1, the link 30 being used to press on the spindle of the valve 11 and open the same when the water has filled the trap to the dotted line. The valve 11 is small and permits the water to escape from the trap till the level falls enough to allow the steam pressure to close the valve when the filling of the trap is repeated. The valve 11 is a double valve which is adapted to close whether the pressure in the trap 1 is above or below the atmosphere, the action of the moving gas at the valve causing the seating of one or the other disks as the pressure is high or low.

It will be understood by those familiar with the art that the trap is always placed at the lowest point of the pipe line.

Having thus described my invention what I claim as new and desire to secure by Letters Patent of the United States is as follows, modifications within the scope of the claims being expressly reserved.

1. In a steam and vacuum trap, a closed receptacle, a pipe-line leading thereto, a valve opening toward said receptacle in said pipe line, an outlet for said receptacle, a discharge valve having two gates in said outlet, one of said gates adapted to remain normally closed at times of high pressures in said receptacle, the other gate adapted to remain normally closed at times of low pressures in said receptacle, a float, and means connected with the float and adapted to hold said discharge valve open at times during which there is a higher pressure in said receptacle than outside it, said means adapted to hold said valve open until the water in said receptacle has fallen below a predetermined level, substantially as set forth.

2. In a steam and vacuum trap, a closed receptacle, a pipe line leading thereto provided with two branches, a valve opening inwardly into said receptacle in each of said branches, an outwardly opening discharge valve, a valve having two closures and adapted to close when the pressure is higher than or lower than the atmosphere, an air valve, means to operate said air valve and comprising a float and levers connected therewith, one of said levers adapted to open one of the first mentioned inwardly opening valves when the water in the receptacle has fallen below a predetermined point.

In testimony whereof I have set my hand this 20th day of June A. D. 1908, in the presence of the two subscribed witnesses.

CHARLES DAVID TILLISON.

Witnesses:
 FRANK P. MEDINA,
 EDITH W. BURNHAM.